United States Patent
Moulton et al.

(10) Patent No.: US 6,893,730 B2
(45) Date of Patent: May 17, 2005

(54) BARRIER FILM WITH REDUCED DYNAMIC COEFFICIENT OF FRICTION

(75) Inventors: Jeffrey D. Moulton, Morristown, NJ (US); Simon J. Porter, Allentown, PA (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 10/253,767

(22) Filed: Sep. 24, 2002

(65) Prior Publication Data

US 2004/0058173 A1 Mar. 25, 2004

(51) Int. Cl.$^7$ .......................... B32B 27/00; B32B 27/34; B32B 1/02
(52) U.S. Cl. .................. 428/474.4; 428/34.3; 428/34.6; 428/34.7; 428/34.9; 428/35.2; 428/36.6; 428/36.9; 428/36.91; 428/411.1; 428/476.3; 428/475.4; 428/500; 428/516; 428/518; 264/172.19; 264/173.11; 264/173.12; 264/173.15; 264/173.17; 264/173.19; 264/176.1
(58) Field of Search .......................... 428/474.4, 411.1, 428/34.3, 34.6, 34.7, 34.9, 36.6, 36.9, 36.91, 476.3, 500, 516, 518, 475.4, 35.2; 264/176.1, 172.19, 173.19, 173.17

(56) References Cited

U.S. PATENT DOCUMENTS

| | | | |
|---|---|---|---|
| 6,087,020 A | 7/2000 | Vandekerckhove et al. | 428/476.1 |
| 6,117,561 A | 9/2000 | Jacquemet et al. | 428/475.5 |
| 6,316,067 B1 | 11/2001 | Edwards et al. | 428/34.9 |
| 6,390,676 B1 * | 5/2002 | Colombo et al. | 383/204 |
| 2002/0172435 A1 * | 11/2002 | Colombo et al. | 383/127 |
| 2003/0165646 A1 * | 9/2003 | Porter | 428/35.2 |
| 2003/0170409 A1 * | 9/2003 | Porter et al. | 428/34.9 |

FOREIGN PATENT DOCUMENTS

EP                620244        10/1994

* cited by examiner

Primary Examiner—P. Hampton Hightower
(74) Attorney, Agent, or Firm—Virginia Szigeti; Roger H. Criss

(57) ABSTRACT

Oxygen barrier films having a greatly improved dynamic coefficient of friction, and specifically, oxygen barrier films having an exceptionally low dynamic coefficient of friction, reduced moisture sensitivity and good oxygen barrier properties over a wide range of relative humidities. The low coefficient of friction is obtained by using film layers which are blends of a polyamide component and a high density polyethylene which surround an oxygen barrier layer, such as an ethylene vinyl alcohol layer.

39 Claims, No Drawings

BARRIER FILM WITH REDUCED DYNAMIC COEFFICIENT OF FRICTION

BACKGROUND OF THE INVENTION

1. Field of the Invention

The invention relates to oxygen barrier films having a greatly improved dynamic coefficient of friction. More particularly, the invention pertains to oxygen barrier films having an exceptionally low dynamic coefficient of friction, reduced moisture sensitivity and good oxygen barrier properties over a wide range of relative humidities.

2. Description of the Prior Art

It is conventional in the art to employ oxygen barrier films to produce containers such as bags, sachets or pouches that may be used to store a wide range of products. After these containers are formed and filled with a product, they are typically packed into boxes, crates or other storage means and shipped out to distributors. In order to simplify the process of forming these bags, filling them with a product, packing them into boxes and shipping them out, it is conventional to use sophisticated, automatic packaging machines that conducts each of these steps very rapidly to maximize output. In conducting such a production process, it is common to feed multiple bags into a storage box at once, sliding one bag onto another into a single storage box until that box is filled. A key property that allows for this process to progress rapidly and with good efficiency is for one film surface to slide along another film surface so that it may slide into its proper position in storage. Accordingly, it is an important goal in the packaging industry to improve this automatic storage process in order to assist the manufacturer in conducting an effective and efficient production process.

Although some friction is required between surfaces, it has been found to be a problem in the art that most films exhibit excessive friction between two adjacent surfaces. Particularly, films having high friction between two surfaces in contact with one another have been known to cause bags to become stuck in a misaligned position during this automatic packaging process, causing jamming of production equipment and reducing packaging efficiency.

In order to improve the ability for one film to slide along the surface of another film, i.e. bags having minimal friction at their surfaces, it is necessary that the bags have external surfaces with a low dynamic coefficient of friction. To accomplish this, it has been known to add antiblock or slip additives to film layers that reduce the coefficient of friction of films. While these additives are useful in reducing the dynamic coefficient of friction of films, they are expensive. In addition, such additives frequently result in the attraction of contaminants onto the film surfaces, resulting in contamination of equipment and extra cleaning costs. Therefore other means are desired. One such method has included subjecting films to an electric charge. For example, U.S. Pat. No. 4,297,187 teaches a technique that uses a corona discharge treatment involving subjected polymeric film layers to an electrical charge of a high voltage in a gas atmosphere. This treatment avoids the tendency of films to form wrinkles or scratches owing to poor slippage between the film and metallic guide rolls in film production or processing lines, such as in the case of automatic packaging machines. However, this process adds expensive and inconvenient processing steps.

Accordingly, there remains a need in the art for a multi-layered film which has a low dynamic coefficient of friction without the need for antiblock or slip additives. It is also desirable to have a film which has good oxygen barrier properties, particularly at elevated temperatures and humidities.

SUMMARY OF THE INVENTION

The invention provides a multilayered oxygen barrier film which comprises:

a) a first blend layer having first and second surfaces and comprising a blend of at least one polyamide component and at least one high density polyethylene;

b) an oxygen barrier layer having first and second surfaces attached to the first blend layer, wherein the first surface of the oxygen barrier layer is in contact with the second surface of the first blend layer; and c) a second blend layer having first and second surfaces attached to the oxygen barrier layer, said second blend layer comprising a blend of at least one polyamide component and at least one high density polyethylene; and wherein the first surface of the second blend layer is in contact with the second surface of the oxygen barrier layer.

Preferably, a sealant film is attached to the second surface of the second blend layer.

This invention also provides a multilayered oxygen barrier film which comprises:

a) a first blend layer having first and second surfaces and comprising a blend of at least one polyamide component and at least one high density polyethylene;

b) ethylene vinyl alcohol oxygen barrier layer having first and second surfaces attached to the first blend layer, wherein the first surface of the oxygen barrier layer is in contact with the second surface of the first blend layer; and c) a second blend layer having first and second surfaces attached to the oxygen barrier layer, the second blend layer comprising a blend of at least one polyamide component and at least one high density polyethylene; and wherein the first surface of the second blend layer is in contact with the second surface of the oxygen barrier layer and wherein the polyamide components of the first and second blend layers comprise nylon 6.

The invention further provides a process for forming a multilayered oxygen barrier film which comprises the steps of:

a) forming a first blend of at least one polyamide component and at least one high density polyethylene;

b) forming a first blend layer from said polyamide-polyolefin blend, which first blend layer has first and second surfaces;

c) attaching an oxygen barrier layer to the first blend layer, which oxygen barrier layer has first and second surfaces, and wherein the first surface of the oxygen barrier layer is in contact with the second surface of the first blend layer; and d) attaching a second blend layer formed from a blend of at least one polyamide component and at least one high density polyethylene to said oxygen barrier layer, which second blend layer has first and second surfaces, and wherein the first surface of the second blend layer is in contact with the second surface of the oxygen barrier layer.

It has been found that polymeric oxygen barrier films having outer film layers formed from a polyamide-polyolefin blend unexpectedly reduces the dynamic coefficient of friction of the packaging film, allowing for efficient packing. It has been unexpectedly found that when used in the formation of oxygen barrier packaging films, polyamide-polyolefin blends exhibit a reduced dynamic coefficient of friction, as well as excellent oxygen barrier properties at a wide range of humidities. Importantly, said reduced dynamic coefficient of friction is achieved without the addition of antiblock or slip additives.

The invention therefore provides a desirable multilayered barrier film having excellent oxygen barrier properties, good moisture sensitivity and an exceptionally low dynamic coefficient of friction that is achieved without the addition of antiblock or slip additives.

DETAILED DESCRIPTION OF THE PREFERRED EMBODIMENTS

The invention provides a multilayered oxygen barrier packaging film having good oxygen barrier properties and having a low dynamic coefficient of friction. In the production of a multilayered film according to the invention, an oxygen barrier layer having first and second surfaces has a first polyamide-polyolefin blend layer attached to its first surface and a second polyamide-polyolefin blend layer attached to its second surface. In another embodiment of the invention, a heat sealable sealant layer is attached a surface of the second polyamide-polyolefin blend layer which is not in contact with the oxygen barrier layer.

Each of the first and second polyamide-polyolefin blend layers comprise a polyamide component and a polyolefin component. Polyamides (or nylons) are conventionally used in the art of multilayered packaging films. Suitable nylons within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art.

Such include the reaction products of diacids with diamines. Useful diacids for making polyamides include dicarboxylic acids which are represented by the general formula

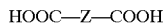

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

H$_2$N(CH$_2$)$_n$NH$_2$ wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulfone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6/6,6), hexamethylene adipamide/caprolactam copolymer (nylon 6,6/6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6, nylon 6,6/6 as well as mixtures of the same. The most preferred polyamide is nylon 6.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamineco-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethylene-terephthalamide (nylon 6,6/6T), poly (2,2,2-trimethyl hexamethylene terephthalamide), poly(m-xylylene adipamide) (MXD6), poly(p-xylylene adipamide), poly (hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

The polyamide component is combined with at least one high density polyethylene. Preferably, the polyamide component and the high density polyethylene are combined with a coupling agent and mixed to form a blend. A coupling agent is preferred to be in the blend because the polyamide component and the high density polyethylene may otherwise be incompatible. Suitable coupling agents comprise materials selected from the group consisting of maleated alpha olefins and maleated elastomers. Of these, the preferred coupling agent is a maleated alpha olefin. In the preferred embodiment of the invention, the coupling agent comprises from about 0.1% to about 7% by weight of each of the first blend layer and the second blend layer, more preferably from about 0.5% to about 6% and most preferably from about 1% to about 5% by weight of said layers.

Advantageously, non-maleated elastomers such as tri and tetracopolymers of styrene and linear or branched olefins may be added to improve toughness and processability. In the preferred embodiment of the invention, the elastomeric agent comprises from about 0.1% to about 7% by weight of the polyamide-polyolefin blend, more preferably from about 0.5% to about 6% and most preferably from about 1% to about 5% by weight of the blend.

The polyamide-high density polyethylene blend may be formed by dry blending solid particles or pellets of the polyamide component, high density polyethylene and the coupling agent together with any optional additives and then melt blending the mixture in a suitable mixing means such as twin screw extruder, a roll mixer or the like. Typical melting temperatures range from about 175° C. to about 300° C., preferably from about 215° C. to about 275° C., and more preferably from about 220° C. to about 250° C., where the polyamide is nylon 6. Blending is conducted for a period of time required to attain a substantially uniform blend. Such may easily be determined by those skilled in the art. If desired, the blend may subsequently be cooled and cut into pellets or other shapes for further processing, or it may be immediately formed into said first and second blend layers.

In the preferred embodiment of the invention, the high density polyethylene preferably comprises from about 10% to about 50% by weight of each of the first blend layer and the second blend layer, more preferably from about 15% to about 45%, and most preferably from about 20% to about 40% by weight of each blend layer. Further, in the preferred embodiment of the invention, each of the first and second blend layers are formed from the same batch of polyamide-high density polyethylene blend. Accordingly, said first blend layer preferably contains a quantity of said polyamide component and said high density polyethylene which is equal to the quantity of said polyamide component and said high density polyethylene present in said second blend layer.

The first blend layer has first and second surfaces and is attached at its second surface to a first surface of an oxygen barrier layer. The second blend layer having first and second surfaces is attached at its first surface to a second surface of the oxygen barrier layer. The oxygen barrier layer may be any suitable barrier layer which provides the requisite oxygen barrier properties, such as polymeric layers which provide an oxygen transmission rate of about 16 cc per $m^2$ per day or less, preferably about 5 cc per $m^2$ per day or less and more preferably about 0.9 cc per $m^2$ per day or less, at 65% relative humidity at 20° C. Examples of such layers are those that comprise one or more of the following: ethylene vinyl alcohol copolymer, MXD6 nylon, acrylonitrile copolymers (e.g., Barex®), liquid crystal polymers (e.g., Vectran®), epoxy based barrier resins (a polyhydroxyaminoether such as Blox®), nanocomposites, and oxygen scavenging materials such as blends of MXD6 and metal salts or blends of polydienes (e.g., polybutadiene) and metal salts. The oxygen barrier layer preferably comprises an ethylene vinyl alcohol layer. Ethylene vinyl alcohol compounds are well known in the art and readily commercially available. Copolymers of ethylene and vinyl alcohol suitable for use in the present invention can be prepared, for example, by the methods disclosed in U.S. Pat. Nos. 3,510,464; 3,560,461; 3,847,845; 3,595,740 and 3,585,177. The ethylene vinyl alcohol copolymer can be a hydrolyzed ethylene vinyl acetate copolymer. The degree of hydrolysis can range from about 85% to about 99.5%. The ethylene vinyl alcohol copolymer preferably contains from about 15 to about 65 mol percent ethylene and more preferably about 25 to about 50 mol percent ethylene. Copolymers of lower than 15 mol percent ethylene tend to be difficult to extrude while those above 65 mol percent ethylene have reduced oxygen barrier performance. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, which may be obtained, for example, by the hydrolysis of an ethylene/vinyl acetate copolymer or by chemical reaction of ethylene monomers with vinyl alcohol. In the preferred embodiment of the invention, the oxygen barrier layer preferably comprises from about 25 to about 55 percent by weight of this three layered film structure, more preferably from about 30 to about 50 percent by weight and most preferably from about 35 to about 45 weight percent of the first blend layer/oxygen barrier/second blend layer structure.

Preferably attached to the second surface of the second blend layer is a heat sealable sealant film. The sealant film may comprise a material such as ultra low density polyethylene, low density polyethylene, linear low density polyethylene, metallocene linear low density polyethylene, medium density polyethylene, high density polyethylene, polypropylene, ethylene vinyl acetate and combinations thereof. In the preferred embodiment of the invention, the sealant film comprises linear low density polyethylene.

The second blend layer and the sealant film are preferably attached via an intermediate adhesive layer or tie layer. The adhesive layer may be applied either directly onto the second blend layer or onto the sealant film by any appropriate means in the art, such as by coating. Any suitable adhesive may be employed. Such adhesives include polyurethanes, epoxies, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The preferred adhesive material comprises an α-olefin, most preferably the adhesive layer comprises an anhydride modified α-olefin.

Each of the first and second polyamide-high density polyethylene blend films, ethylene vinyl alcohol layer, sealant film and adhesive layer may also optionally include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall composition.

As mentioned above, the first blend layer, the oxygen barrier layer and the second blend layer are preferably attached together by coextrusion. In the coextrusion process, for example, the polymeric material for the individual layers are fed into infeed hoppers of a like number of extruders, each extruder handling the material for one or more of the layers. The melted and plasticated streams from the individual extruders are fed into a single or multimanifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

Alternatively the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the first blend layer, the oxygen barrier layer, the second blend layer, the sealant film and any intermediate adhesive layers are positioned on one another, and the combination is passed through the nip of a pair of heated laminating rollers by techniques well known in the art. In the preferred embodiment of the invention, the first blend layer, the oxygen barrier layer and the second blend layer are attached to one another by coextrusion, and the sealant film is preferably attached to the second blend layer by lamination via an intermediate adhesive layer. However, the sealant film may also be joined with the other individual film layers by coextrusion techniques discussed above. In the preferred embodiment of the invention, adhesive lamination heating may be done at any convenient temperature such as at temperatures ranging from about 35° C. to about 90° C., preferably from about 45° C. to about 80° C. Preferably at least one of the first and second polyamide-polyolefin blend films is oriented prior to being attached to either the sealant film or the oxygen barrier layer. For the purposes of the present invention, the term draw ratio is an indication of the increase in the dimension in the direction of draw. Preferably, in the present invention the first and second polyamide-polyolefin blend layers are drawn to a draw ratio of from 1.5:1 to 5:1 uniaxially in at least one direction, i.e. its longitudinal direction, its transverse direction or biaxially in each of its longitudinal and transverse directions. Preferably, the layers or multilayered film are simultaneously biaxially oriented, that is orienting a film in both the machine and transverse directions at the same. This results in dramatic improvements in clarity, strength and toughness properties. Preferably, the blend layers are biaxially oriented and not heat set so that they are shrinkable both in the transverse and longitudinal directions.

Although each layer of the multilayer film structure may have a different thickness, the thickness of each of the first and second polyamide-polyolefin blend layers is preferably from about 1 $\mu$m to about 25 $\mu$m, preferably from about 2 $\mu$m to about 20 $\mu$m, and more preferably from about 3 $\mu$m to about 15 $\mu$m. The thickness of the oxygen barrier layer is from about 1 $\mu$m to about 30 $\mu$m, preferably from about 3 $\mu$m to about 25 $\mu$m and more preferably from about 5 $\mu$m to about 20 $\mu$m. The thickness of the sealant film is from about 1 $\mu$m to about 100 $\mu$m, preferably from about 2 $\mu$m to about 60 $\mu$m, and more preferably from about 3 $\mu$m to about 50 $\mu$m. In the most preferred embodiment of the invention, the total film thickness is from about 20 $\mu$m to about 300 $\mu$m, more preferably from about 22 $\mu$m to about 150 $\mu$m, and most preferably from about 24 $\mu$m to about 130 $\mu$m. It is also preferred that the thickness of the oxygen barrier layer comprises at least about 10 percent, and more preferably from about 10 percent to about 90 percent, most preferably from about 10 to about 40 percent of the thickness of the combined polyamide and EVOH layers. While such thicknesses are preferred, it is to be understood that other film thicknesses may be produced to satisfy a particular need and yet fall within the scope of the present invention.

The oxygen transmission rate (OTR) of the multilayered film of the invention may be determined via the procedure of ASTM D-3985. In the preferred embodiment, the multi-layered film according to this invention has an OTR of about 16 cc per $m^2$ per day or less, preferably about 5 cc per $m^2$ per day or less and more preferably about 0.9 cc per $m^2$ per day or less at 65% relative humidity at 20° C.

The films of the invention may be used to form bags, pouches or sachets that are easily and readily packaged into crates, boxes or other storage structures with excellent efficiency. The resulting films of the invention have an improved dynamic coefficient of friction over films of the related art. The dynamic coefficient of friction of the multilayered film of the invention may be determined via the procedure ASTM D1894. In the preferred embodiment, the dynamic coefficient of friction is from about 0.10 to about 0.20, more preferably from about 0.15 to about 0.19 and most preferably from about 0.16 to about 0.18. Such a low coefficient is achieved without the addition of any anti-block or slip additives.

The following non-limiting examples serve to illustrate the invention.

EXAMPLE 1

A five layer film was formed by coextruding, in order, a polyethylene sealant layer (a linear low density polyethylene), an adhesive tie layer, a first polyamide-high density polyethylene blend layer (comprising, by weight, 63% nylon 6, 28% high density polyethylene and 9% maleated polyethylene), an EVOH layer and a second polyamide-high density polyethylene blend layer (comprising, by weight, 54% nylon 6, 35% high density polyethylene and 11% maleated polyethylene). Each of the polyethylene sealant layer and adhesive layer were extruded at a melt temperature of 268° C. Each of the first and second polyamide-high density polyethylene blend layers was extruded at a melt temperature of 288° C. and the EVOH layer was extruded at a melt temperature of 232° C. The die temperature was 288° C. The polymers were extruded as a cast film by a typical cast extrusion process. The resulting film had a dynamic coefficient of friction on the polyamide-high density polyethylene blend layer surface of 0.20.

EXAMPLE 2

A three layer film was formed by coextruding in order a first polyamide-high density polyethylene blend layer (comprising, by weight, 63% nylon 6, 28% high density polyethylene and 9% maleated polyethylene) an EVOH layer and a second polyamide-high density polyethylene blend layer (comprising, by weight, 54% nylon 6, 35% high density polyethylene and 11% maleated polyethylene). Each of the first and second polyamide-high density polyethylene blend layers were extruded at melt temperature of 271° C. and the EVOH layer was extruded at a melt temperature of 238° C. The die temperature was 260° C. The polymers were extruded as a cast film by a typical cast extrusion process. The resulting film had a dynamic coefficient of friction on the polyamide-high density polyethylene blend layer surface of 0.18.

EXAMPLE 3 (COMPARATIVE)

A three layer film was formed by coextruding in order a polyamide (nylon 6) layer, an EVOH layer and a second polyamide (nylon 6) layer. Each of the first and second polyamide layers were extruded at melt temperature of 271° C. and the EVOH layer was extruded at a melt temperature of 238° C. The die temperature was 260° C. The polymers were extruded as a cast film by a typical cast extrusion process. The resulting film had a dynamic coefficient of friction on the polyamide layer surface of 0.48.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayered oxygen barrier film which comprises:
   a) a first blend layer having first and second surfaces and comprising a blend of at least one polyamide component and at least one high density polyethylene;
   b) an oxygen barrier layer having first and second surfaces attached to the first blend layer, wherein the first surface of the oxygen barrier layer is in contact with the second surface of the first blend layer; and
   c) a second blend layer having first and second surfaces attached to the oxygen barrier layer, said second blend layer comprising a blend of at least one polyamide component and at least one high density polyethylene; and wherein the first surface of the second blend layer is in contact with the second surface of the oxygen barrier layer.

2. The film of claim 1 wherein said polyamide component comprises nylon 6, nylon 66, nylon 6/6,6, nylon 6,6/6 or a combination thereof.

3. The film of claim 1 wherein said polyamide component comprises nylon 6.

4. The film of claim 1 wherein said high density polyethylene comprises from about 10% to about 50% by weight of each of the first blend layer and the second blend layer.

5. The film of claim 1 wherein said high density polyethylene comprises from about 15% to about 45% by weight of each of the first blend layer and the second blend layer.

6. The film of claim 1 wherein said high density polyethylene comprises from about 20% to about 40% by weight of each of the first blend layer and the second blend layer.

7. The film of claim 1 wherein said oxygen barrier layer comprises an ethylene vinyl alcohol layer.

8. The film of claim 1 wherein said first blend layer, said oxygen barrier layer and said second blend layer are coextruded.

9. The film of claim 1 wherein said first blend layer contains a quantity of said polyamide component and said high density polyethylene which is substantially equal to the quantity of said polyamide component and said high density polyethylene present in said second blend layer.

10. The film of claim 1 wherein said film has a dynamic coefficient of friction of from about 0.10 to about 0.20.

11. The film of claim 1 wherein each of said first blend layer and said second blend layer further comprises at least one coupling agent.

12. The film of claim 11 wherein said coupling agent comprises a material selected from the group consisting of maleated alpha olefins and maleated elastomers.

13. The film of claim 11 wherein said coupling agent comprises from about 0.1% to about 7% by weight of each of said first blend layer and said second blend layer.

14. The film of claim 1 which has an oxygen transmission rate of less than about 16 cc per $m^2$ per day at 65% relative humidity at 20° C.

15. The film of claim 1 wherein said film is either uniaxially or biaxially oriented.

16. The film of claim 1 further comprising a sealant film attached to the second surface of the second blend layer.

17. The film of claim 16 wherein said sealant film comprises a material selected from the group consisting of ultra low density polyethylene, low density polyethylene, linear low density polyethylene, metallocene linear low density polyethylene, medium density polyethylene, high density polyethylene, polypropylene, ethylene vinyl acetate and combinations thereof.

18. The film of claim 16 wherein said sealant film comprises linear low density polyethylene.

19. The film of claim 16 wherein said sealant film is attached to said second blend layer by an intermediate adhesive layer.

20. The film of claim 19 wherein said adhesive layer comprises a material selected from the group consisting of polyurethanes, epoxies, polyesters, acrylics, anhydride modified polyolefins and combinations thereof.

21. The film of claim 20 wherein said adhesive layer comprises an anhydride modified α-olefin.

22. The film of claim 1 which has an oxygen transmission rate of less than about 16 cc per $m^2$ per day at 65% relative humidity at 20° C.

23. The film of claim 1 wherein said film is either uniaxially or biaxially oriented.

24. The film of claim 1 wherein said oxygen barrier layer has an oxygen transmission rate of less than about 16 cc per $m^2$ per day at 65% relative humidity at 20° C.

25. A multilayered oxygen barrier film which comprises:
   a) a first blend layer having first and second surfaces and comprising a blend of at least one polyamide component and at least one high density polyethylene;
   b) an ethylene vinyl alcohol oxygen barrier layer having first and second surfaces attached to the first blend layer, wherein the first surface of the oxygen barrier layer is in contact with the second surface of the first blend layer; and
   c) a second blend layer having first and second surfaces attached to the oxygen barrier layer, said second blend layer comprising a blend of at least one polyamide component and at least one high density polyethylene; and wherein the first surface of the second blend layer is in contact with the second surface of the oxygen barrier layer and wherein said polyamide components of said first and second blend layers comprise nylon 6.

26. The film of claim 25 wherein said high density polyethylene is present in each of said first blend layer and said second blend layer in an amount from about 20% to about 40% by weight.

27. The film of claim 26 wherein each of said first blend layer and said second blend layer further comprises at least one coupling agent selected from the group consisting of maleated alpha olefins and maleated elastomers.

28. The film of claim 27 further comprising a polyolefin sealant film attached to the second surface of the second blend layer.

29. A bag made from the film of claim 28.

30. A process for forming a multilayered oxygen barrier film which comprises the steps of:
   a) forming a first blend of at least one polyamide component and at least one high density polyethylene;
   b) forming a first blend layer from said first blend, which first blend layer has first and second surfaces;
   c) attaching an oxygen barrier layer to the first blend layer, which oxygen barrier layer has first and second surfaces, and wherein the first surface of the oxygen barrier layer is in contact with the second surface of the first blend layer; and
   d) attaching a second blend layer formed from a blend of at least one polyamide component and at least one high density polyethylene to said oxygen barrier layer, which second blend layer has first and second surfaces, and wherein the first surface of the second blend layer is in contact with the second surface of the oxygen barrier layer.

31. The process of claim 30 wherein said second blend layer is formed from said first blend.

32. The process of claim 30 wherein said polyamide component comprises nylon 6, nylon 66, nylon 6/6,6, nylon 6,6/6 or a combination thereof.

33. The process of claim 30 wherein said high density polyethylene comprises from about 10% to about 50% by weight of each of the first blend layer and the second blend layer.

34. The process of claim 30 wherein said high density polyethylene comprises from about 20% to about 40% by weight of each of the first blend layer and the second blend layer.

35. The process of claim 30 wherein said oxygen barrier layer comprises an ethylene vinyl alcohol layer.

36. The process of claim 30 wherein said first blend layer, said oxygen barrier layer and said second blend layer are attached by coextrusion.

37. The process of claim 30 further comprising either uniaxially or biaxially orienting the film.

38. The process of claim 30 further comprising attaching a sealant film to the second surface of the second blend layer.

39. The process of claim 38 wherein said sealant film is attached by an intermediate adhesive layer.

* * * * *